March 6, 1945.  L. H. FUNKEY  2,370,947
FISH CLEANING MACHINE
Filed May 13, 1943  5 Sheets-Sheet 1

Inventor
Lyman H. Funkey
By Clarence A. O'Brien
and Harvey B. Jacobson
Attorneys March 6, 1945. L. H. FUNKEY 2,370,947
FISH CLEANING MACHINE
Filed May 13, 1943 5 Sheets-Sheet 3

Inventor
Lyman H. Funkey
By Clarence A. O'Brien
and Harvey B. Jacobson
Attorneys

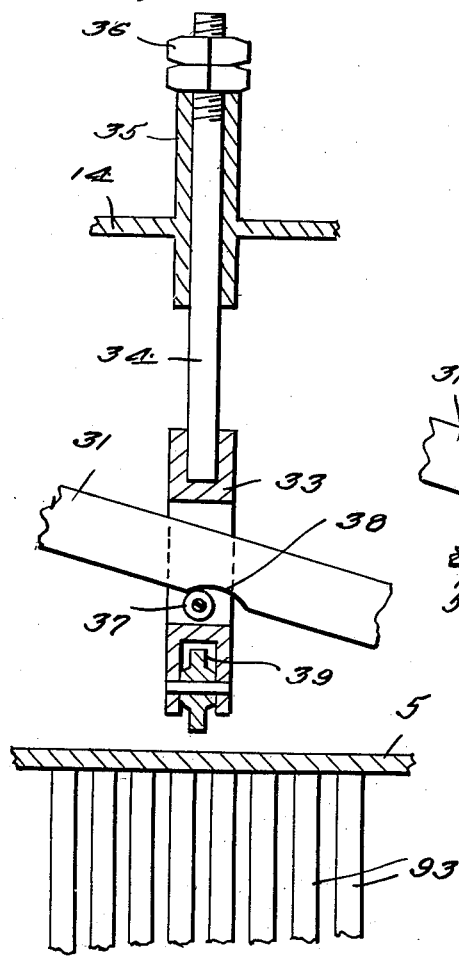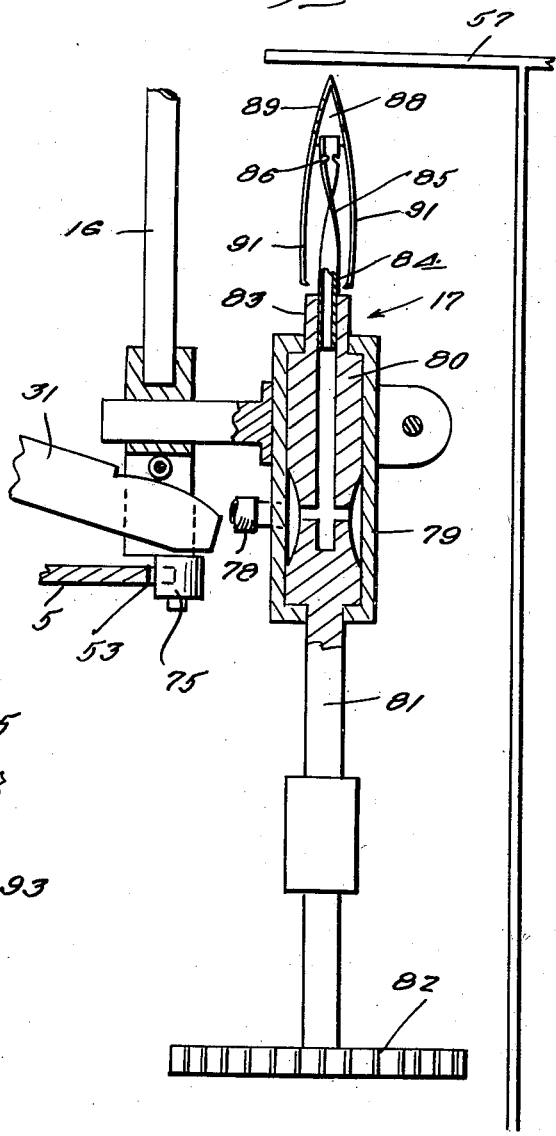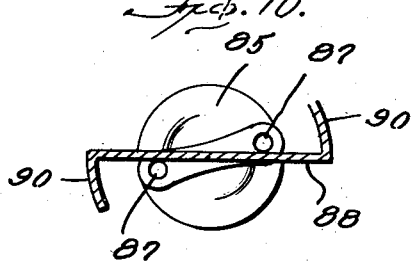

March 6, 1945.    L. H. FUNKEY    2,370,947
FISH CLEANING MACHINE
Filed May 13, 1943    5 Sheets-Sheet 5
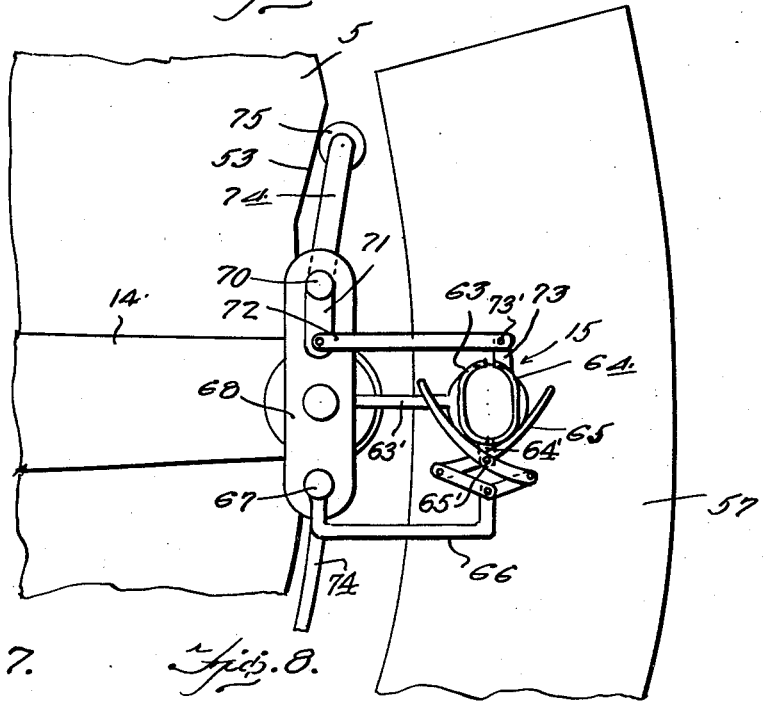
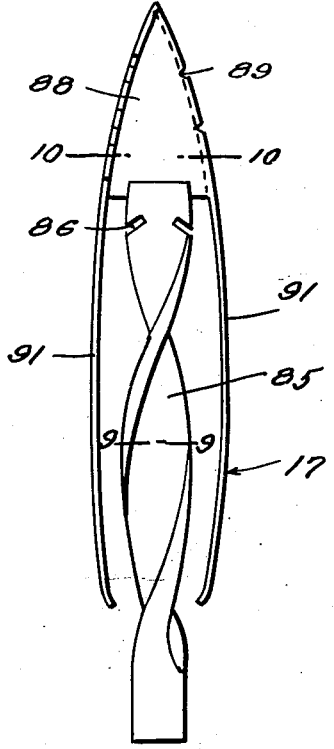
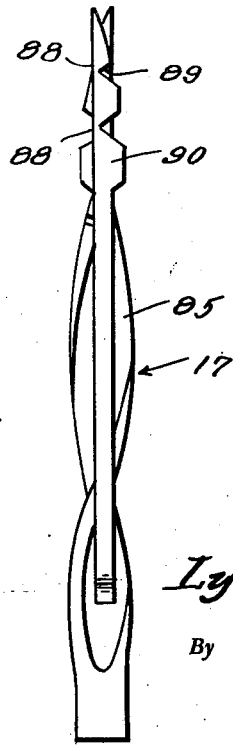
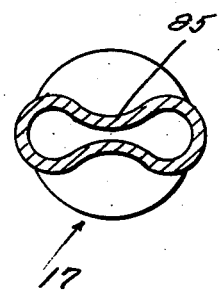
Inventor
Lyman H. Funkey
By Clarence A. O'Brien
and Harvey B. Jacobson
Attorneys Patented Mar. 6, 1945

2,370,947

UNITED STATES PATENT OFFICE 2,370,947

FISH CLEANING MACHINE

Lyman H. Funkey, Marinette, Wis.

Application May 13, 1943, Serial No. 486,875

7 Claims. (Cl. 17—3)

This invention relates to new and useful improvements in fish cleaning machines, the principal object being to provide a viscera extractor or nozzle of improved construction for use in conjunction with fish cleaning machines.

Another important object of the invention is to provide a fish cleaning and extracting nozzle which in operation will serve to cut the viscera from the fish while at the same time washing the inside of the fish with water and blowing out the severed viscera by compressed air.

Still another important object of the invention is to provide a fish cleaning machine in which a self-cleaning nozzle or ejector is employed in the cleaning of fish.

A still further object of the invention is to provide a machine wherein a number of the operations are substantially automatic, particularly with respect to the movement of the rotary cleaning devices which are elevated into held fish at a proper stage in the operation of the machine.

Various other objects and advantages of the invention will become apparent to the reader of the following description.

In the drawings,

Figure 4 is a fragmentary vertical sectional view through the rotary cleaning device.

Figure 5 is a fragmentary vertical sectional view through the lifting means for the rotary cleaning device.

Figure 6 is a fragmentary top elevational view showing one of the fish-holding clamps and the means for actuating the same.

Figure 7 is a side elevational view of one of the nozzles.

Figure 8 is an edge elevational view of one of the nozzles.

Figure 9 is an enlarged section on the line 9—9 of Figure 7.

Figure 10 is a section on the line 10—10 of Figure 7.

Figure 1:
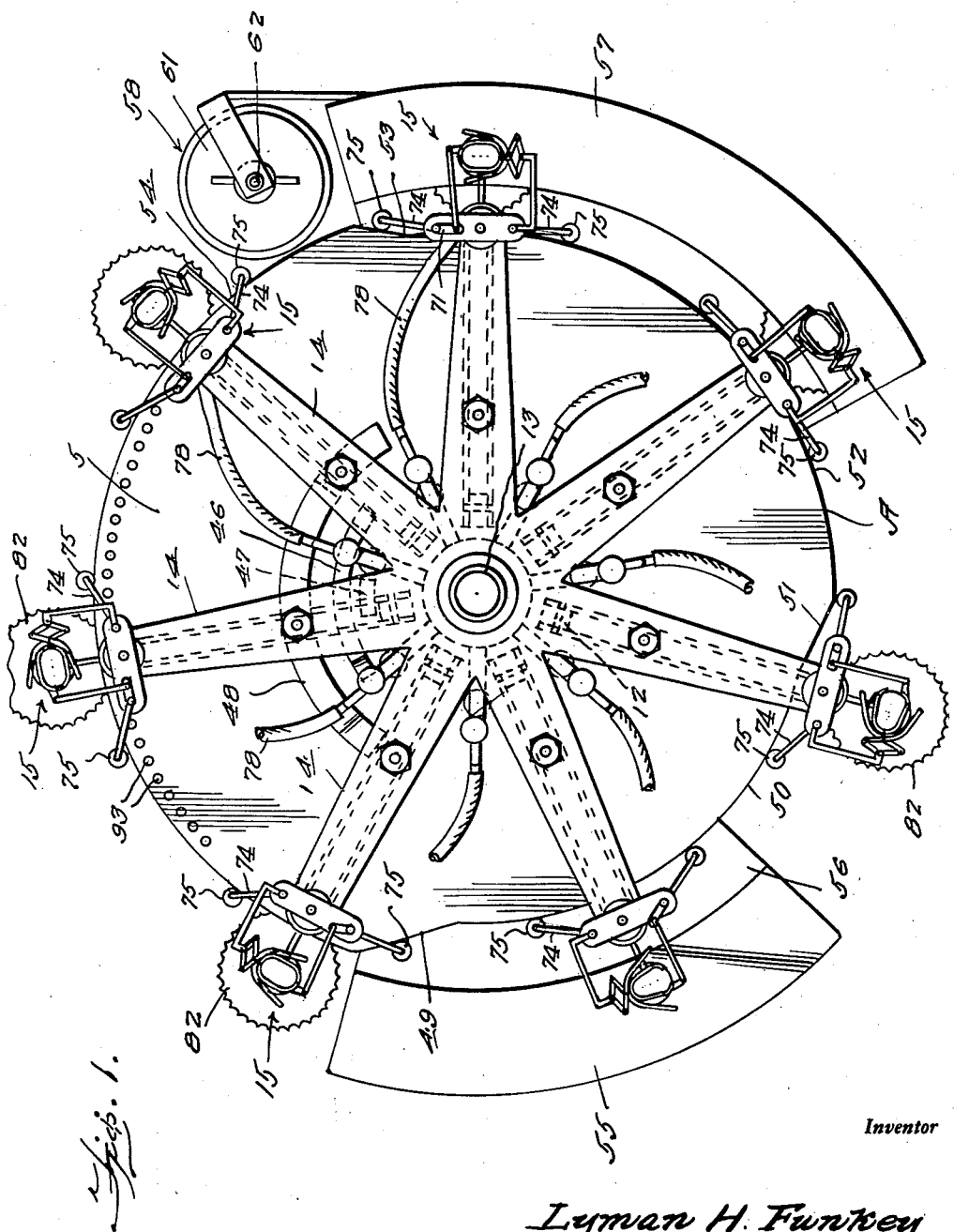
Figure 1 represents a top plan view of the machine.

Referring to the drawings wherein like numerals designate like parts, it can be seen that numeral 5 denotes a table supported by posts 6.

Secured on the central portion of the table 5, is an annulus 7, having a flange overhanging a base flange 8 on a cylinder 9, which is vertically disposed and which has a transverse partition 10 at the midpoint of its interior. Thus it can be seen that the cylinder 9 is rotatably mounted on the table 5.

Carried by the upper end of the cylinder 9 is a header 11 which has a hub 12 suitably secured thereto and to this hub and header 11 is secured a drive shaft 13 for rotating the cylinder 9 and connected mechanism.

Figure 2:
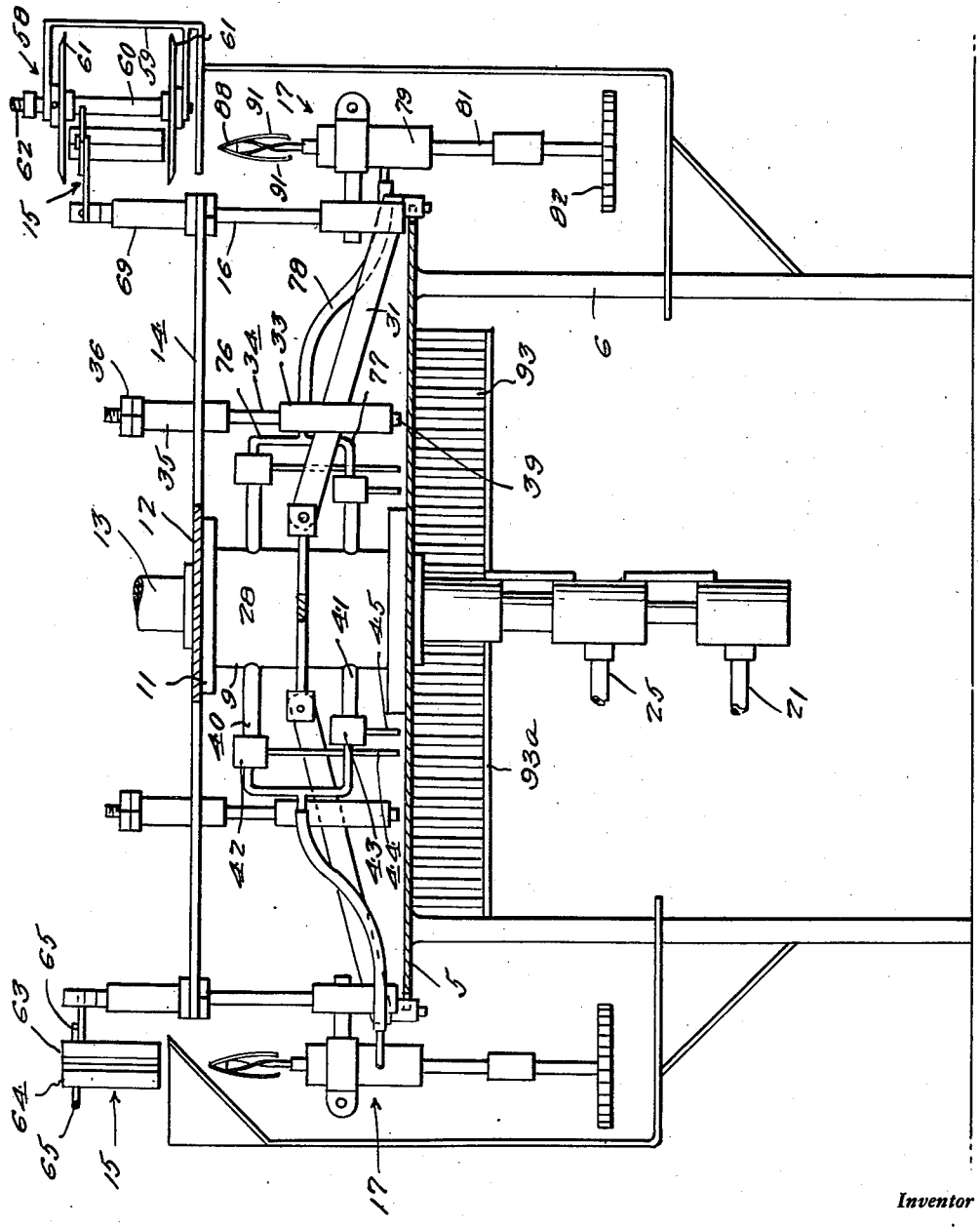
Figure 2 is a transverse sectional view through the machine.

Radiating from the hub 12 are arms 14 which extend to a point substantially over the edge portion of the table 5 and on the outer end of each arm 14 is a fish clamping mechanism 15 and a guide for a rod 16 which is part of a fish cleaning device generally referred to by numeral 17 (see Figure 2).

Figure 3:
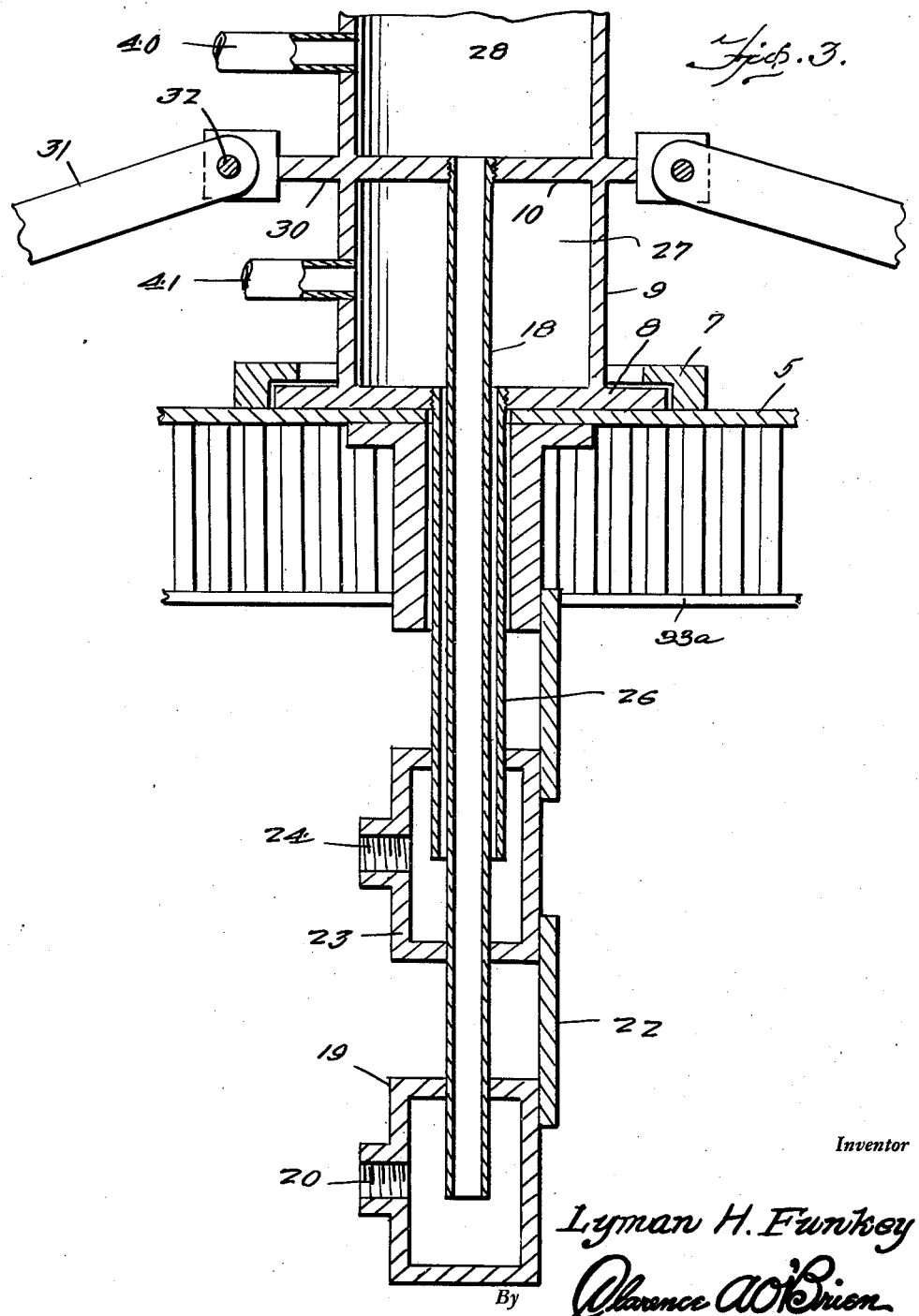
Figure 3 is a fragmentary vertical sectional view through the central portion of the machine.

Reverting now to the structure shown in Figure 3, it can be seen that a tube 18 extends downwardly from the partition 10 in the cylinder 9, through an opening in the table 5 and down to terminate within a water receiving box 19. The box is bored as at 20 to receive a water supply line 21. The box 19 is connected by a strap 22 to an overlying air receiving box 23 which is bored as at 24 to accommodate a compressed air supply pipe 25.

Tube 18 depends through a tube 26 which connects the box 23 with chamber 27 in the cylinder 9 below the partition 10. Chamber 28 above the partition 10 receives water from the water box 19 and line 21.

The cylinder 9 has a circumferential flange 30 to which the inner ends of arms 31 are pivotally secured as at 32. The arms 31 extend outwardly and through stirrups 33 which are suspended by rods 34 slidable through guide barrels 35 located on corresponding spokes 14. The upper ends of these rods 34 are threaded to accommodate nuts 36 whereby the extent of movement of the arms 31 can be regulated.

As can be seen in Figure 5, each stirrup 33 has a roller 37 which coacts with the notch 38 in the lower edge of the corresponding arm 31 and each stirrup 33 is bifurcated at its lower end to receive a roller 39.

The chambers 27 and 28 (see Figure 3 and Figure 2) have pipes 40 and 41 respectively extending therefrom and terminating in valves 42, 43, respectively, the latter valve 43 being located slightly inwardly of the valve 42. Each valve has a valve element and the valves 42 have depending control stems 44, while the valves 43 for air have depending control stems 45. The stems 44 and 45 are located in a path over corresponding controlling cams 46, 47, located on the table 5. The cam 47 is substantially shorter than the cam 46 so that less air will be used than water. In other words the cleaning operation starts off with the utilization of water, and with the sweeping action of air forces the viscera out and ends with flushing water.

A cam strip 48 substantially longer than the water controlling cam strip 46 is in the path of the yokes 33 for the cleaning device lifting arms 31 and their rollers 39 ride the cam strip 48. Cam strip 48 has a wavy surface which causes the cleaning device 17 to oscillate vertically when the machine is in motion.

Figure 1 shows the construction of the edge portion of the table 5. The edge portion of the table 5 is in fact a cam, the edge portion being cut in deeply as at 49 to define a concentric edge 50. A slope 51 outwardly from the edge 50 defines an edge 52 which is the arc of a greater circle than the edge 50 and this continues to a slope 53 which leads to an edge 54 which is on an arc of a circle greater than the edges 50 and 52.

Adjacent the edge 50 is an arcuate table 55 onto which cleaned fish are dropped and this may have a chute 56 if desired.

Numeral 57 denotes a table over which the fish in a clamped position move toward a cutting mechanism generally referred to by numeral 58.

The cutting mechanism 58 consists of a bracket 59 in which is a vertical shaft 60 carrying a pair of disk cutting blades 61, 61, the shaft 60 being driven by flexible drive shaft 62.

Referring in detail to the fish-clamping mechanism 15, each arm 14 carries a block 68 fixed to the upper end of the guide 69 for the shaft 16. Shafts 67, 70 are journaled in the opposite ends of the block 68 to depend therefrom. Arms 74 having rollers 75 extend from the lower ends of the shafts 67, 70. Crank 71 extends from the upper end of shaft 70. A lever 72 is rigid with the crank 71 and provided with a lateral lug 73 pivoted thereto, as at 73' and carrying rigid therewith a movable jaw 64 swingable about said pivot 73'. A jaw 63 is rigidly connected to the block 68 by means of a rigid arm 63'. The jaw 63 is provided with a lug 64' upon which is pivoted, as at 65', a pair of toggle levers 65. The toggle levers 65 are operated by a U-shaped arm 66 which is secured to the shaft 67 and in a manner to swing the jaw 64 toward the jaw 63. The rollers 75 ride the edge portion of the table 5.

Pipes 76, 77 extend from the valves 42, 43 and connect to a common flexible conduit 78 which extends to the corresponding cleaning device 17. Each cleaning device 17 consists of a box or bearing 79 for receiving a bearing member 80 in the form of an enlargement of a shaft 81, at the lower end of which is a spoke gear 82. The upper end of the bearing body 80 is reduced and projects above the bearing 80 as at 83 and receives the lower end portion 84 of a twisted nozzle 85, which has downwardly directed outlet openings 86 adjacent the upper end and the upper end is formed with additional openings 87 (see Figure 10).

A scraper is carried by this nozzle, the same consisting of a substantially triangular-shaped plate 88 suitably secured to the upper end of the twisted nozzle 85 and being notched as at 89 to provide cleaning teeth. Each longitudinal edge of the plate 88 has a lateral cutting edge 90, these edges being disposed in opposite directions, and from these cutting edges cleaning tails or blades 91, 91 depend.

It can be seen that along the edge portion 54 of the stationary table 5, spaced pins 93 define a gear section against which the spoke gears 82 of the cleaning device 17 can mesh in order to turn the cleaning device. The lower ends of the pins 93 are secured to a bar 93a while the upper ends are suitably secured to the edge portion of the table 5.

As the mechanism is rotated by the drive shaft 13, the rollers 75 on the arms 74 ride the edge portion of the table. Fish are inserted heads down in the clamps 15 before the clamp devices reach the shoulder 53. As the rollers 75 ride over the shoulder 53 onto the edge 54, the fish become clamped in position and the heads and tails are severed at the cutting device 58. At this point the rollers 39 of the lifting means shown in Figure 5 ride the cam strip 48, lifting the cleaning device 17 as shown in Figure 4, so that the nozzle enters the head and tail severed carcass of the fish. As the spoke gear 82 (see Figure 4) meshes with the gear pins 93 the cleaner starts to rotate. At this point due to the action of the cams 46 and 47 against the pins 44 and 45, water and air is supplied as a cleansing medium. The viscera is actually blown from the fish as the scraping operation takes place. Water is supplied as a carrying off medium.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, and vertically movable fish cleaning devices adapted to enter fish held in the clamps after their heads and tails have been removed.

2. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, and vertically movable fish cleaning devices adapted to enter fish held in the clamps after their heads and tails have been removed, said fish cleaning devices being carried by the cylinder.

3. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, and vertically movable fish cleaning devices adapted to enter fish held in the clamps after their heads and tails have been removed, said fish cleaning devices being carried by the cylinder, said cylinder being divided into air and water chambers and conduits extending from said chambers to the fish cleaning devices.

4. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, and vertically movable fish cleaning devices adapted to enter fish held in the clamps after their heads and tails have been removed, said fish cleaning devices being carried by the cylinder, said cylinder being divided into air and water chambers and conduits extending from said chambers to the fish cleaning devices, valve means for said chambers, and cam means on the table for actuating said valve means as the cylinder rotates.

5. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, vertically movable fish cleaning devices adapted to enter fish held in the clamps after their heads and tails have been removed, and arms pivotally secured to the cylinder and carrying the cleaning devices.

6. A fish cleaning machine comprising a table, a cylinder mounted on the table, spokes radiating from the cylinder, a drive shaft for the cylinder, said cylinder being rotatably mounted on the table, fish clamping means at the outer ends of the spokes, a cutting device for cutting heads and tails off of fishes held in the clamps, vertically movable fish cleaning devices adapted to enter fish held in the clamps after their heads and tails have been removed, arms pivotally secured to the cylinder and carrying the cleaning devices, and cam actuated means for lifting and lowering and oscillating the cleaning device.

7. A fish cleaning machine comprising a table, a cylinder, a drive shaft for the cylinder, said cylinder being rotatably mounted on the table, fish clamping means at the outer ends of the spokes, a cutting device for cutting heads and tails off of fishes held in the clamps, vertically movable fish cleaning devices adapted to enter fish held in the clamps after their heads and tails have been removed, and coacting means between the cleaning devices and the table whereby the cleaning devices are rotated while inserted in fish.

LYMAN H. FUNKEY.